Figure 1:
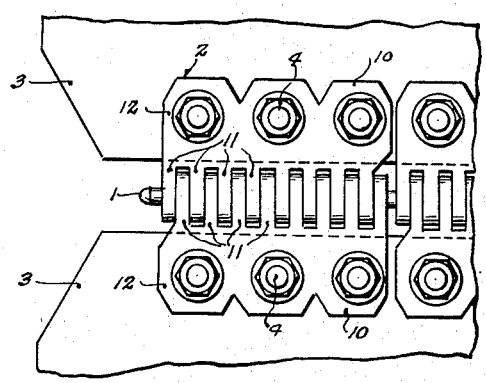

Dec. 6, 1960

M. B. BEACH 2,962,782

HINGE PIN

Filed Dec. 9, 1957

INVENTOR.
MILTON B. BEACH
BY
Soans, Anderson, Luedeka & Fitch
ATTYS.

United States Patent Office 2,962,782
Patented Dec. 6, 1960

2,962,782
HINGE PIN

Milton B. Beach, Wheaton, Ill., assignor to Flexible Steel Lacing Company, Chicago, Ill., a corporation of Illinois Filed Dec. 9, 1957, Ser. No. 701,455

3 Claims. (Cl. 24—33)

This invention relates generally to an improvement in a hinge pin, and more specifically to an improvement in a flexible hinge pin adapted for use with flexible hinged belt fasteners.

Various forms of belt fasteners are used to join the ends of conveyor, elevator, and transmission belts. So that these belts may travel freely through a predetermined curved path and be quickly and easily extended or disassembled, a belt fastener with a strong hinged joint is often used. Often during use it is desirable to guide these belts in a different shape transversely than its original flat shape. An example of this would be where the belt is guided in the shape of a trough to prevent the material being conveyed from falling off the sides of the belt. To permit a continuous belt to be shaped in this manner a series of fasteners are required rather than one continuous hinge. These hinged fasteners are generally joined together by a common flexible hinge pin.

One type of flexible hinge pin is constructed of a stranded galvanized cable covered with nylon. This type of hinge pin presents a smooth wearing surface and will stay in the joint as long as the belt is in tension. When it is desired to extend the belt, the tension on the belt is released, the hinge pin is pushed out, and the new section of belt is added. From being pushed in and out of the joint and also from ordinary wear and tear, the ends of the hinge pin, unless protected, become frayed and enlarged.

The practice of using hinge pins with flexible hinged belt fasteners has been to cut the hinge pin to the desired length and to round off the ends by any suitable means. Corresponding hinged belt fasteners on the two belts that are to be joined are interdigitated so that the bight portions of the hinged belt fasteners are aligned, and the hinge pin is then inserted. The tapered nose on the hinge pin acts as a guide in the movement of the hinge pin through the aligned bights. Due to a possible misapplication of the belt fasteners, uneven longitudinal stretching of the belt material to which the individual belt fasteners are attached, and the deviation of the hinge pin from a straight line, the hinge pin will engage the edges of the bight portions when it is pushed through. This difficulty in threading will eventually cause the nose of the hinge pin to become blunt and frayed.

Since one of the main purposes of the flexible hinge joint is to allow the belt to be easily and quickly extended or disassembled, a hinge pin that cannot be pushed in or removed easily is undesirable.

The principal object of this invention is to provide a flexible hinge pin with durable rounded ends which will allow the hinge pin to be easily pushed in and out of the joint formed by interconnecting flexible hinge fasteners. Another object of this invention is to provide a means of easily and efficiently attaching rounded metallic end members to a length of nylon-covered cable which is to be used as a hinge pin.

Figure 2:
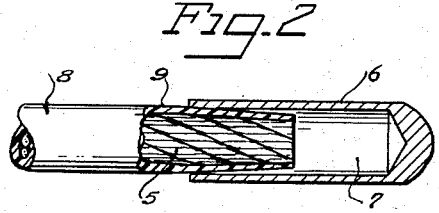
Figure 5:
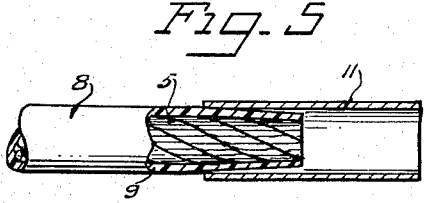
Figure 3:
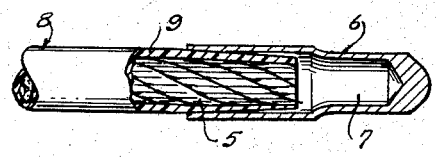
Figure 6:
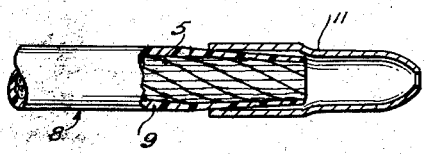
Figure 4:
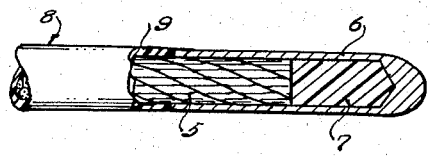
Figure 7:
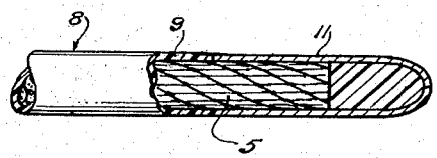

Other objects of the invention will be apparent from the following description and accompanying drawings. In the drawings:

Figure 1 is a fragmentary plan view of a pair of belt ends joined together by a series of hinged belt fasteners showing a common flexible hinge pin formed in accordance with the present invention;

Figures 2, 3, and 4 are enlarged fragmentary cross sectional views of one end of the flexible hinge pin showing the metallic end piece in different stages of being attached to the cable; and Figures 5, 6, and 7 are enlarged fragmentary cross sectional views of one end of the flexible hinge pin showing an alternate type of metallic end piece in different stages of being attached to the cable.

Referring to the drawings, there is illustrated the present flexible hinge pin used to join standard types of flexible hinged fasteners. One form of these hinged fasteners is illustrated at 2 in Figure 1, and is generally similar to that shown in Patent No. 2,477,855. The hinged fasteners 2 are shown in operative position interconnecting a pair of belt ends 3. Each of the hinged fasteners 2 includes two attaching members 12 and an interconnecting hinge pin 1. Each attaching member 12 is preferably in the form of a relatively heavy plate of U shape having a pair of opposed arm sections 10, and a plurality of separate connecting loops 11. One of the arms of each attaching member 12 may be provided with a pair of inwardly extending prongs (not shown) on the side edges of that arm, which is forced into the belt during the attachment of the hinge fasteners. Bolts 4 pass through the upper arm 10, the belt ends 3, and the lower arm 10 of the fasteners. A suitable tool is generally used to attach a series of hinged fasteners 2 on abutting ends of the belt 3 so that corresponding loops 11 or bights are aligned.

To join two belt sections 3—3, the attaching members 12 on adjoining belts are interdigitated so as to form a row of aligned loops or bights 11. Hinge pin 1 is then pushed transversely through these loops and a strong joint is formed. To separate the two belts, tension on belts 3—3 is relaxed and the hinge pin 1 is either pulled or pushed through the loops. The two belts 3—3 are then separable.

Hinge pin 1 is rounded on both ends and is comprised of nylon-covered cable 8 having a rounded metallic end piece 6 firmly attached in telescopic relation to at least one end thereof. The nylon-covered cable 8 may be formed of a standard galvanized cable 5, having spirally wound groups of spring steel wires, and an extruded nylon sleeve 9 firmly bound to the outside of the stranded cable 5.

Nylon is used as the material for the outer sleeve because it is an excellent and durable wearing material, and also because nylon will return to its original shape after being compressed or stretched. One nylon-covered cable that may be used with the usual hinged fasteners that are suitable for interconnecting belting having a thickness between about ⅜ inch to ½ inch is one-quarter of an inch in diameter and comprises a stranded cable, having spirally wound seven groups of nineteen spring steel wires, and a nylon sleeve approximately one thirty-second of an inch in thickness.

Figures 2, 3 and 4 show various steps in the attachment of the metallic end 6 to the nylon-covered cable 8. A process that may be used to attach the metallic end piece to nylon-covered cable is called swaging. Swaging is the process of working steel or other material while cold by striking the object being worked a large number of successive blows. The completed work has a very smooth finish.

Metallic end piece 6 is tubular with one end closed and rounded. Any hard non-corrodible metal which can be cold worked is a suitable material for the end piece 6. The end piece can be produced by taking a piece of rod stock of diameter slightly larger than the nylon-covered cable on which it is to be attached, drilling a hole lengthwise almost through the material and rounding one end. The internal diameter of the metallic end piece 6 is made slightly less than the outside diameter of the nylon-covered cable 8, and the wall thickness should be generally similar to the sleeve thickness of the nylon 9. In general, this end piece may be of plated or stainless steel approximately one inch in length, with a cavity of approximately seven-eighths of an inch in length.

The end of the nylon-covered cable 8 is rotary swaged to a taper so that it can be partially inserted into the smaller hole of the end piece 6. After being inserted into the end piece 6 a space 7 will be left at the bottom of the closed end piece 6 for any compression of air and displacement of the nylon sleeve 9.

Swaging is then used to decrease the outside diameter of the end piece 6 as is shown in Figure 3. The swaging is preferably initiated at the outer end of the end piece 6 and progressively advanced along the end piece whereby the nylon sleeve is displaced into the space 7. This process is continued until the outside diameter of the end piece 6 is approximately equal to the outside diameter of the nylon-covered cable 8 as is shown in Figure 4. A firm mechanical bond is formed by the compression of the stranded cable 5 and the nylon sleeve 9.

Alternatively, the end piece may be formed from short tubular member 11 open at both ends. The member 11 may be attached to a nylon-covered cable 8 as is shown in Figures 5, 6 and 7. The end of the nylon-covered cable 8 is swaged to a taper and then inserted into the tubular member 11. The degree of tapering of this end of the cable 8 should be such that when it is inserted into the tubular member 11 it will extend only partially therethrough. The member, which forms the end piece, is then swaged onto the nylon-covered cable in a similar manner as with the end piece 6. The final rounding of the nose of the end piece 11 is formed by swaging after the end piece is firmly secured to the end of the cable.

The resulting hinge pin 1 has a smooth transition from the metallic end piece 6 to the nylon-covered cable 8 with a firm union accomplished between the stranded cable 8 and the metallic end piece 6.

It has been found that the above-described hinge pin is very easily threaded into a hinge joint and is durable. It will be evident that various modifications in shape, or manufacture, can be made in the above without departing from the scope of the present invention.

I claim:

1. A flexible hinge pin adapted for use with flexible hinged fasteners, said hinge pin including a nylon covered cable and a metallic end member telescopically secured over at least one end of said nylon covered cable, said nylon covered cable comprising an elongated stranded metallic cable and a nylon sleeve surrounding said stranded metallic cable in intimate contact therewith over the entire length thereof, the exposed portion of said nylon sleeve having a smooth outer surface, said metallic end member having its outer end closed and rounded with a gradually decreasing circular cross section and having its remaining portion with an exterior configuration coinciding with the adjacent outer surface of the exposed portion of said nylon sleeve.

2. A flexible hinge pin adapted for use with flexible hinged fasteners, said hinge pin including a nylon covered cable and a tubular metallic end member telescopically swaged over at least one end portion of said nylon covered cable, said nylon covered cable comprising an elongated stranded metallic cable and a nylon sleeve surrounding said stranded metallic cable in intimate contact therewith along the entire length thereof, the exposed portion of said nylon sleeve having a smooth outer surface and a circular cross section, said tubular metallic end member having its outer end closed and rounded with a gradually decreasing circular cross section and having its remaining portion of approximately the same outer diameter as the adjacent exposed portion of said nylon sleeve, said end portion of said nylon covered cable within said end member being compressed by said end member so as to firmly attach said end member to said nylon covered cable.

3. A flexible hinge pin adapted for use with flexible hinged fasteners, said hinge pin including a nylon covered cable and a tubular metallic end member telescopically swaged over an end portion of said nylon covered cable, said nylon covered cable comprising an elongated stranded metallic cable and a nylon sleeve surrounding said stranded metallic cable in intimate contact therewith over the entire length thereof, the exposed portion of said nylon sleeve having a smooth outer surface and a circular cross section, said tubular metallic end member having its outer end closed to define a cavity extending beyond the end of said stranded metallic cable and rounded with a decreasing circular cross section to facilitate insertion of said hinge pin within the aligned bights of interconnectable hinged fasteners, said end member having its remaining portion with a wall thickness and outer diameter approximately equal to the thickness and outer diameter, respectively, of the exposed portion of said nylon sleeve, said end portion of said nylon covered cable within said end member being compressed by said end member to firmly attach said end member to said nylon covered cable, and the portion of said nylon sleeve within said end member being partially displaced to at least partially fill said cavity.

References Cited in the file of this patent

UNITED STATES PATENTS

| | | |
|---|---|---|
| 2,024,880 | Rydquist | Dec. 17, 1935 |
| 2,050,855 | Oppenheim | Aug. 11, 1936 |
| 2,480,280 | Bergan | Aug. 30, 1949 |
| 2,551,299 | Sowa | May 1, 1951 |
| 2,629,909 | Hall | Mar. 3, 1953 |
| 2,680,273 | Brickman | June 8, 1954 |
| 2,766,317 | Woodward | Oct. 9, 1956 |

FOREIGN PATENTS

| | | |
|---|---|---|
| 626,111 | Great Britain | July 8, 1949 |
| 677,669 | Great Britain | Aug. 20, 1952 |